(12) United States Patent
Chang et al.

(10) Patent No.: US 12,392,898 B2
(45) Date of Patent: Aug. 19, 2025

(54) ACTIVE DISTANCE MEASURING DEVICE AND METHOD OF ACTIVE DISTANCE MEASURING

(71) Applicant: GIGA-BYTE TECHNOLOGY CO., LTD., New Taipei (TW)

(72) Inventors: Chih-Liang Chang, New Taipei (TW); Jyun-Hong Lu, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 944 days.

(21) Appl. No.: 17/530,489

(22) Filed: Nov. 19, 2021

(65) Prior Publication Data

US 2022/0187460 A1 Jun. 16, 2022

(30) Foreign Application Priority Data

Dec. 16, 2020 (TW) ................................. 109144582

(51) Int. Cl.
*G01S 17/42* (2006.01)
*G01S 7/48* (2006.01)
*G01S 7/4865* (2020.01)
*G01S 17/931* (2020.01)

(52) U.S. Cl.
CPC ............ *G01S 17/42* (2013.01); *G01S 7/4808* (2013.01); *G01S 7/4865* (2013.01); *G01S 17/931* (2020.01)

(58) Field of Classification Search
CPC ...... G01S 17/42; G01S 7/4808; G01S 17/931; G01S 7/4865; G01S 7/484; G01S 7/4868; G01S 7/4911; G01S 7/4918

USPC ......................................................... 356/4.01
See application file for complete search history.

(56) References Cited

FOREIGN PATENT DOCUMENTS

| CN | 109564291 A | 4/2019 |
|---|---|---|
| DE | 10151982 A1 | 4/2003 |
| DE | 102018217277 A1 | 4/2020 |

OTHER PUBLICATIONS

Translation of abstract of Lages et al., DE10151982, 2003, 2 pp. translation created 3/5/3035 (Year: 2025).*
Translation of description of Lages et al., DE10151982, 2003, 43 pp. translation created 3/5/3035 (Year: 2025).*

(Continued)

*Primary Examiner* — Daniel L Murphy
(74) *Attorney, Agent, or Firm* — Idea Intellectual Limited; Sam T. Yip

(57) ABSTRACT

An active distance measuring device includes a detection wave transmitter, a reflected wave receiver and a controller. The detection wave transmitter is configured to transmit the detection wave with a designated transmission power to be reflected to form a reflected wave. The reflected wave receiver is configured to operate at a designated detection power to receive the reflected wave and generate reflected wave information accordingly. The controller is electrically connected to the detection wave transmitter and the reflected wave receiver, to control the detection wave transmitter to transmit the detection wave and receive the reflected wave information, so as to obtain distance information based on a transmission state of the detection wave and the reflected wave information. The controller is further configured to receive a vehicle speed signal to adjust the designated transmission power and designated detection power according to the vehicle speed signal.

13 Claims, 7 Drawing Sheets

(56) References Cited

OTHER PUBLICATIONS

Translation of claims of Lages et al., DE10151982, 2003, 9 pp. translation created 3/5/3035 (Year: 2025).*
Extended European Search Report of corresponding European Patent Application No. 21209856.0 mailed on May 11, 2022.

* cited by examiner

ACTIVE DISTANCE MEASURING DEVICE AND METHOD OF ACTIVE DISTANCE MEASURING

CROSS-REFERENCE TO RELATED APPLICATION

This non-provisional application claims priority under 35 U.S.C. § 119(a) to Patent Application No. 109144582 filed in Taiwan, R.O.C. on Dec. 16, 2020, the entire contents of which are hereby incorporated by reference.

BACKGROUND

Technical Field

This disclosure relates to a distance measuring device for vehicles, and in particular, to an active distance measuring device and an active distance measuring method.

Related Art

Existing vehicles are equipped with active safety systems to give warnings to drivers in advance during travelling, actively intervene in vehicle control, or provide driving assistance. Technologies related to collision avoidance include a forward collision warning, automatic emergency braking, active distance maintenance at a constant speed, and blind spot detection and warning. The technologies related to collision avoidance are to transmit a detection wave by a detection wave transmitter and receive a reflected wave by a detector. A system obtains a distance to an object by analyzing the reflected wave, and then determines a possibility that a collision occurs, so as to determine whether to intervene in driving. The above detection wave includes but is not limited to an invisible light laser, an infrared ray, and an ultrasonic wave.

All sub-systems, including the above active safety system, on electric vehicles are operated with electric energy provided by batteries. Transmission, receiving, and analysis of a detection wave each require electrical energy. Continual operation of the active safety system consumes a large amount of electricity, resulting in a decrease in endurance capacity of the electric vehicle.

SUMMARY

Based on the above technical problems, this disclosure provides an active distance measuring device and a method thereof, which can effectively reduce power consumption during distance detection.

At least one embodiment of this disclosure provides an active distance measuring device. The active distance measuring device includes a detection wave transmitter, a reflected wave receiver, and a controller. The detection wave transmitter is configured to transmit a detection wave with a designated transmission power to be reflected to form a reflected wave. The reflected wave receiver is configured to operate at a designated detection power to receive the reflected wave and generate reflected wave information. The controller is electrically connected to the detection wave transmitter and the reflected wave receiver to control the detection wave transmitter to transmit the detection wave and receive the reflected wave information, so as to obtain distance information based on a transmission state of the detection wave and the reflected wave information. The controller is further configured to receive a vehicle speed signal to adjust the designated transmission power and the designated detection power according to the vehicle speed signal.

In at least one embodiment, the vehicle speed signal corresponds to a vehicle speed, and the vehicle speed is positively correlated with the designated transmission power and the designated detection power.

In at least one embodiment, the active distance measuring device further includes a transmitter driving circuit electrically connected to the detection wave transmitter, wherein the controller is electrically connected to the transmitter driving circuit, and the controller controls the transmitter driving circuit according to the designated transmission power, to have the transmitter driving circuit to drive the detection wave transmitter to transmit the detection wave with the designated transmission power.

In at least one embodiment, the controller provides corresponding reference power to the transmitter driving circuit according to the designated transmission power, to have the transmitter driving circuit to drive the detection wave transmitter to transmit the detection wave with the designated transmission power.

In at least one embodiment, the active distance measuring device further includes a digital-to-analog converter electrically connected to the controller. The controller controls the digital-to-analog converter according to the designated transmission power, so that the digital-to-analog converter provides corresponding reference power to the transmitter driving circuit, to have the transmitter driving circuit to drive the detection wave transmitter to transmit the detection wave with the designated transmission power.

In at least one embodiment, to adjust the designated transmission power includes to adjust a duty cycle or a transmission frequency of the detection wave transmitter, or to adjust a peak power of the detection wave.

In at least one embodiment, to adjust the designated detection power includes to adjust a modulation frequency or a frame rate of the reflected wave receiver.

In at least one embodiment, the controller receives a vehicle speed increase signal, determines a predicted vehicle speed after a retention time based on the vehicle speed increase signal, and increases the designated transmission power and the designated detection power to correspond to the predicted vehicle speed.

In at least one embodiment, the detection wave transmitter and the reflected wave receiver are synchronized through a synchronization signal.

This disclosure further provides an active distance measuring method. The active distance measuring method includes: continuously receiving a vehicle speed signal related to a vehicle speed; determining a designated transmission power and a designated detection power according to the vehicle speed; transmitting a detection wave with the designated transmission power to form a reflected wave, and receiving the reflected wave with the designated detection power, so as to obtain distance information; determining whether the vehicle speed has changed; and adjusting the designated transmission power and the designated detection power according to the changed vehicle speed when the vehicle speed has changed.

In at least one embodiment, the active distance measuring method further includes: before the continuously receiving the vehicle speed signal related to a vehicle speed, starting to transmit the detection wave with an initial transmission power, and receive the reflected wave with an initial detection power.

In at least one embodiment, the active distance measuring method further includes: determining whether a vehicle speed increase signal is received; determining a predicted vehicle speed after a retention time according to the vehicle speed increase signal; and increasing the designated transmission power and the designated detection power according to the predicted vehicle speed to correspond to the predicted vehicle speed.

In at least one embodiment, the vehicle speed is positively correlated with the designated transmission power and the designated detection power.

In at least one embodiment, adjusting the designated transmission power includes adjusting a duty cycle and a transmission frequency of the detection wave, or adjusting a peak power of the detection wave.

In at least one embodiment, adjusting the designated detection power includes adjusting a modulation frequency or a frame rate of the received reflected wave.

According to the active distance measuring device and the active distance measuring method of this disclosure, the transmission of the detection wave and the receiving of the reflected wave are not normally performed at a fixed power but at a dynamically adjusted power according to a vehicle speed. When a vehicle travels at a relatively low speed, the transmission power of the detection wave and the detection power of the reflected wave can be reduced in time according to the vehicle speed, and are increased at a high vehicle speed. Therefore, this disclosure not only can effectively reduce power consumption of the active distance measuring device, but also can maintain required distance measuring sensitivity and accuracy.

BRIEF DESCRIPTION OF THE DRAWINGS

This disclosure will become more fully understood from the detailed description given herein below for illustration only, and thus not limitative of this disclosure, wherein.

DETAILED DESCRIPTION

As used hereinafter, the term "module" refers to an application specific integrated circuit (ASIC), an electronic circuit, a microprocessor, a chip that executes one or more software or firmware programs, or a combinational logic circuit. The module is configured to execute various algorithms, transforms, and/or logical processes to generate one or more signals. When a module, a server, and a service are implemented in software, a module can be readable instruction stored in memory for execution by the chip or the combinational logic circuit.

Figure 1:
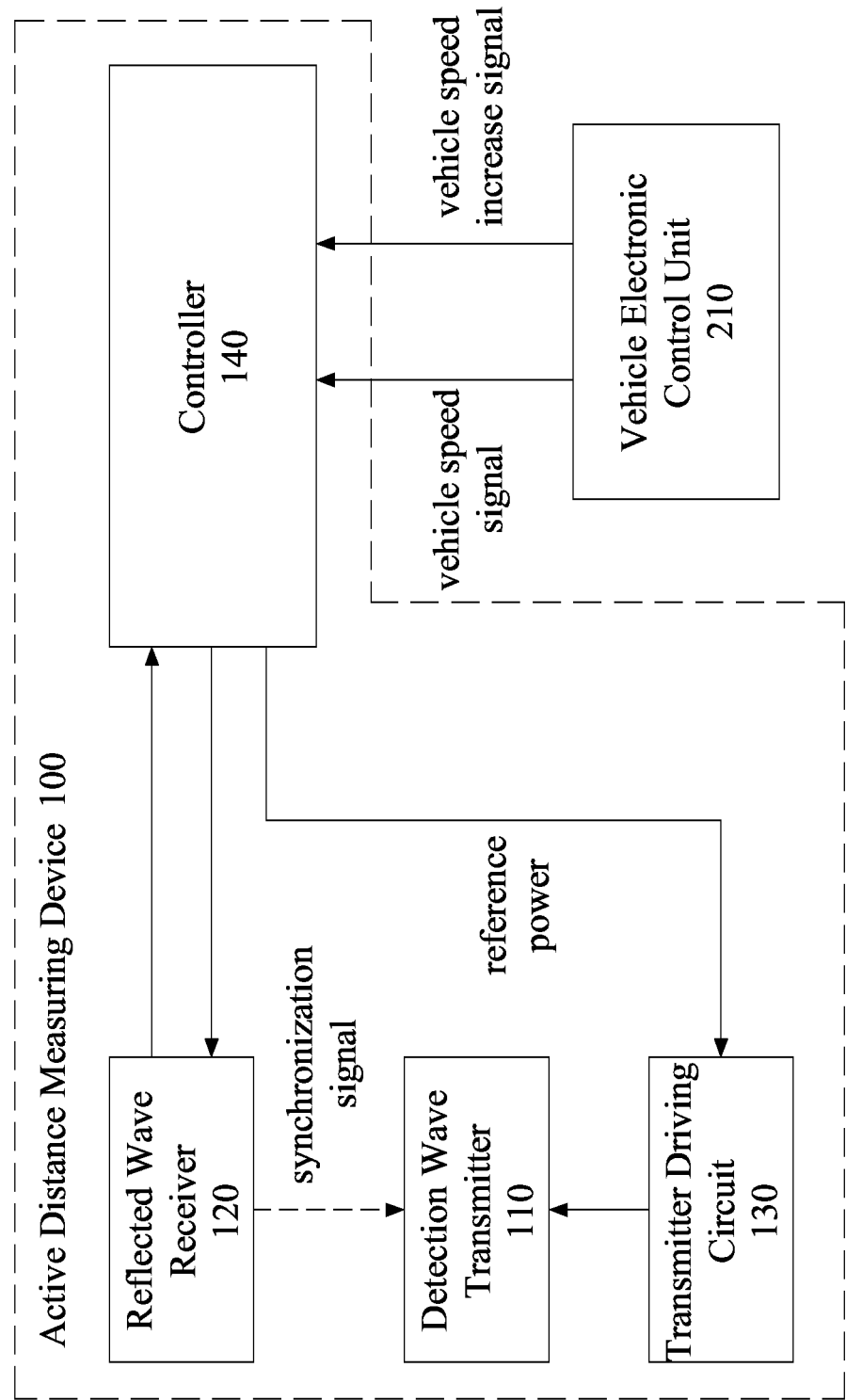
FIG. 1 is a circuit block diagram of an active distance measuring device according to an embodiment of this disclosure.

As shown in FIG. 1, an active distance measuring device 100 according to an embodiment of this disclosure is shown.

The active distance measuring device includes a detection wave transmitter 110, a reflected wave receiver 120, a transmitter driving circuit 130, and a controller 140. The controller 140 may be a system on a chip (SoC), and the controller 140 may be an independent module or a part of an on-board unit (OBU) of a vehicle. The controller 140 is electrically connected to the vehicle electronic control unit (ECU) 210 for receiving vehicle speed status. The vehicle speed status includes a vehicle speed signal and a vehicle speed increase signal. Components of the active distance measuring device 100 are directly or indirectly electrically connected to an electric power system of a vehicle 200 to obtain operating power. When the vehicle 200 is an electric vehicle, the above power is from a battery of the vehicle 200. When the vehicle 200 is a fueled vehicle or a hybrid vehicle, the above power may be from a generator.

Figure 2:
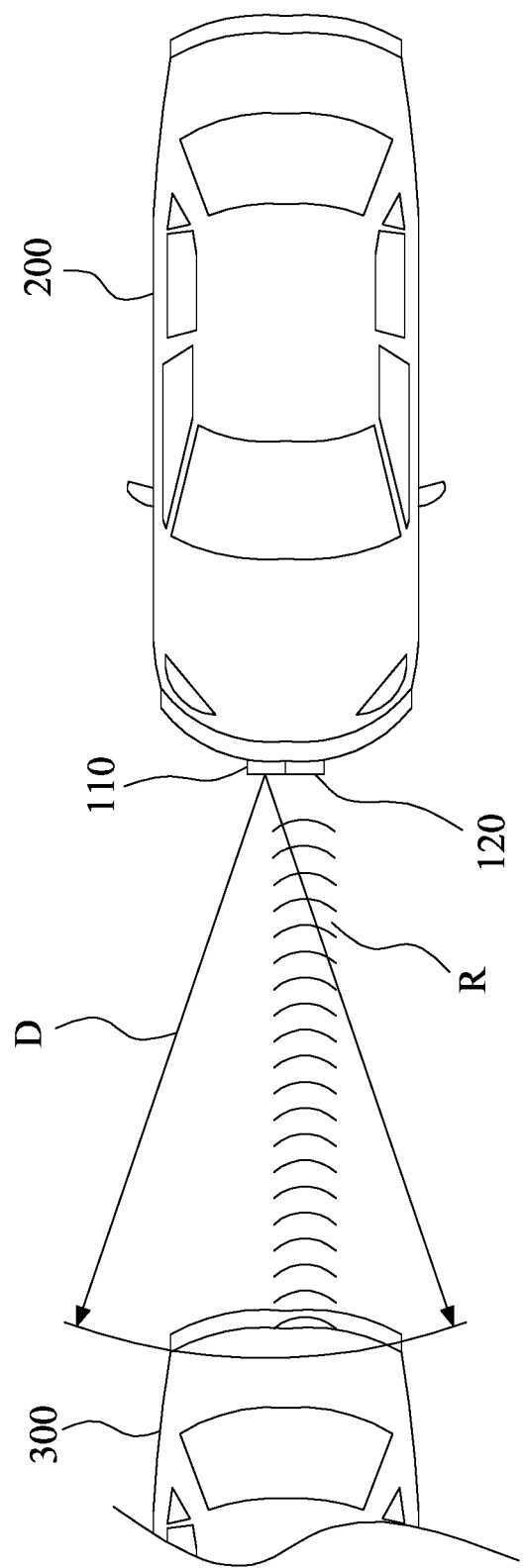
FIG. 2 is a schematic diagram of the active distance measuring device according to the embodiment of this disclosure.

As shown in FIG. 1 and FIG. 2, the detection wave transmitter 110 is assembled on a surface of the vehicle 200 and directed to a specific direction. The specific direction may also be continuously changed. For example, the detection wave transmitter 110 continuously rotates by 360 degrees on a plane at a fixed rotation speed. The detection wave transmitter 110 may be mounted at a front bumper, a hood, a roof, or a rearview mirror for transmitting a detection wave D in a specific direction with the designated transmission power to be reflected by an object 300 to form a reflected wave R.

As shown in FIG. 1 and FIG. 2, the reflected wave receiver 120 is assembled on the surface of the vehicle 200 and directed to the above specific direction. Specifically, the reflected wave receiver 120 is orientated within a range in which the detection wave transmitter 110 transmits the detection wave D, and operates at the designated detection power, to receive the reflected wave R and generate reflected wave information.

As shown in FIG. 1, the transmitter driving circuit 130 is electrically connected to the detection wave transmitter 110 for driving the detection wave transmitter 110 to transmit the detection wave D with the designated transmission power. The controller 140 is electrically connected to the vehicle electronic control unit 210, the transmitter driving circuit 130, and the reflected wave receiver 120, and is indirectly electrically connected to the detection wave transmitter 110 through the transmitter driving circuit 130.

As shown in FIG. 1 and FIG. 2, the controller 140 receives the vehicle speed signal from the vehicle electronic control unit 210, to determine the designated transmission power and the designated detection power according to the vehicle speed signal. The controller 140 controls the transmitter driving circuit 130 according to the designated transmission power to drive the detection wave transmitter 110 to transmit the detection wave D with the designated transmission power. The controller 140 also controls the reflected wave receiver 120 to operate at the designated detection power. The controller 140 obtains information about a distance from the vehicle 200 to the object 300 according to a transmission state of the detection wave D and the reflected wave information, for example, a difference between times of transmission and receiving, and transmits the information to the vehicle electronic control unit 210 or an on-board information unit, for an active safety system to determine and perform necessary intervention measures.

Referring to FIG. 1 and FIG. 2, the vehicle speed signal corresponds to a current vehicle speed of the vehicle 200. It is assumed that the vehicle speed changes between a first vehicle speed and a second vehicle speed, and the first vehicle speed is greater than the second vehicle speed. When the vehicle 200 travels at the first vehicle speed, braking or avoidance needs to be performed in advance to avoid a collision. In this case, an effective detection distance of the active distance measuring device 100 needs to be increased to detect a distant object 300. A response speed of the active distance measuring device 100 also needs to be increased to respond to a quick change in the distance, to avoid an excessively large detection interval. When the vehicle 200 travels at the lower second vehicle speed, measures for collision avoidance can be postponed. In this case, an effective detection distance of the active distance measuring device 100 may be reduced to detect a close object 300. Since the distance changes relatively slowly, the response speed may also be reduced. In addition, at the first vehicle speed, an accuracy of the active distance measuring device 100 needs to be increased to respond to the quick change in the distance, or otherwise at the second vehicle speed, the accuracy may be reduced.

Figure 3:
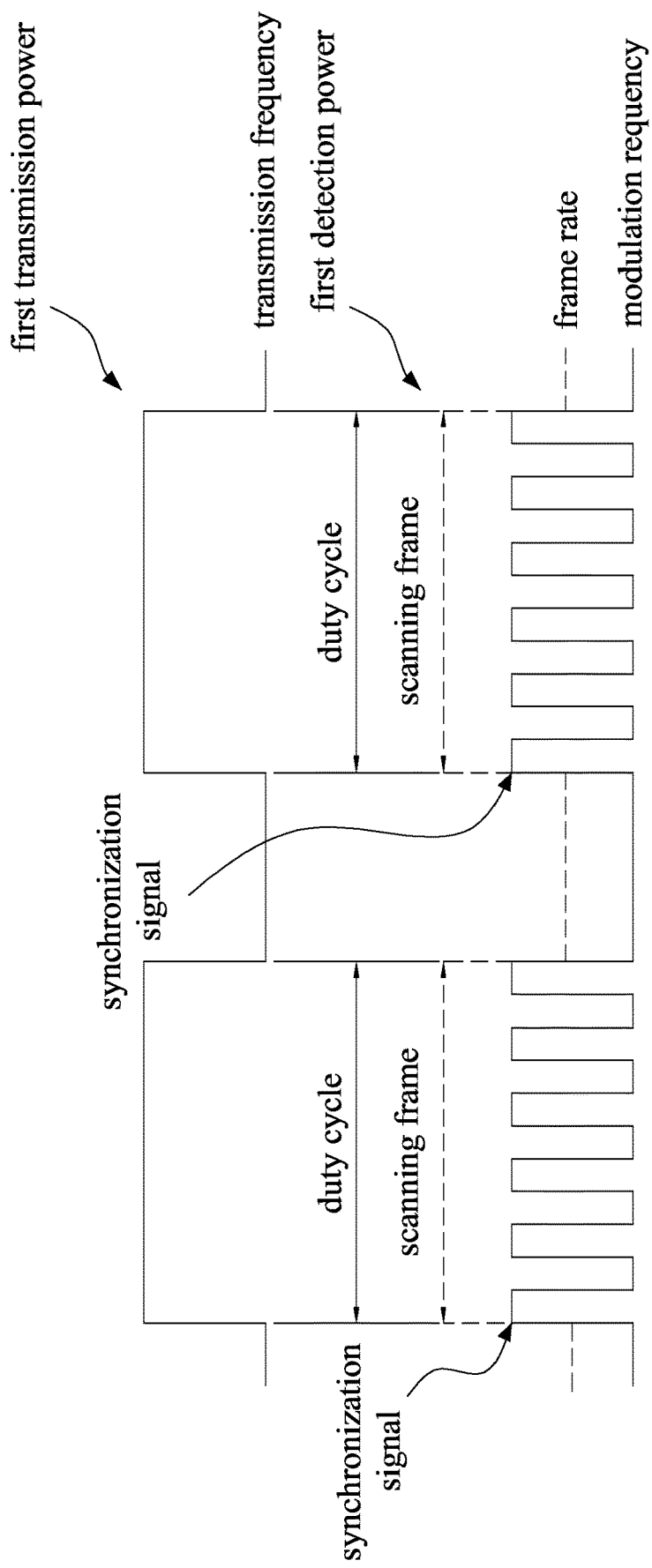
FIG. 3 and FIG. 4 are schematic diagrams of adjusting a designated transmission power and a designated detection power according to the embodiment of this disclosure.
Figure 4:
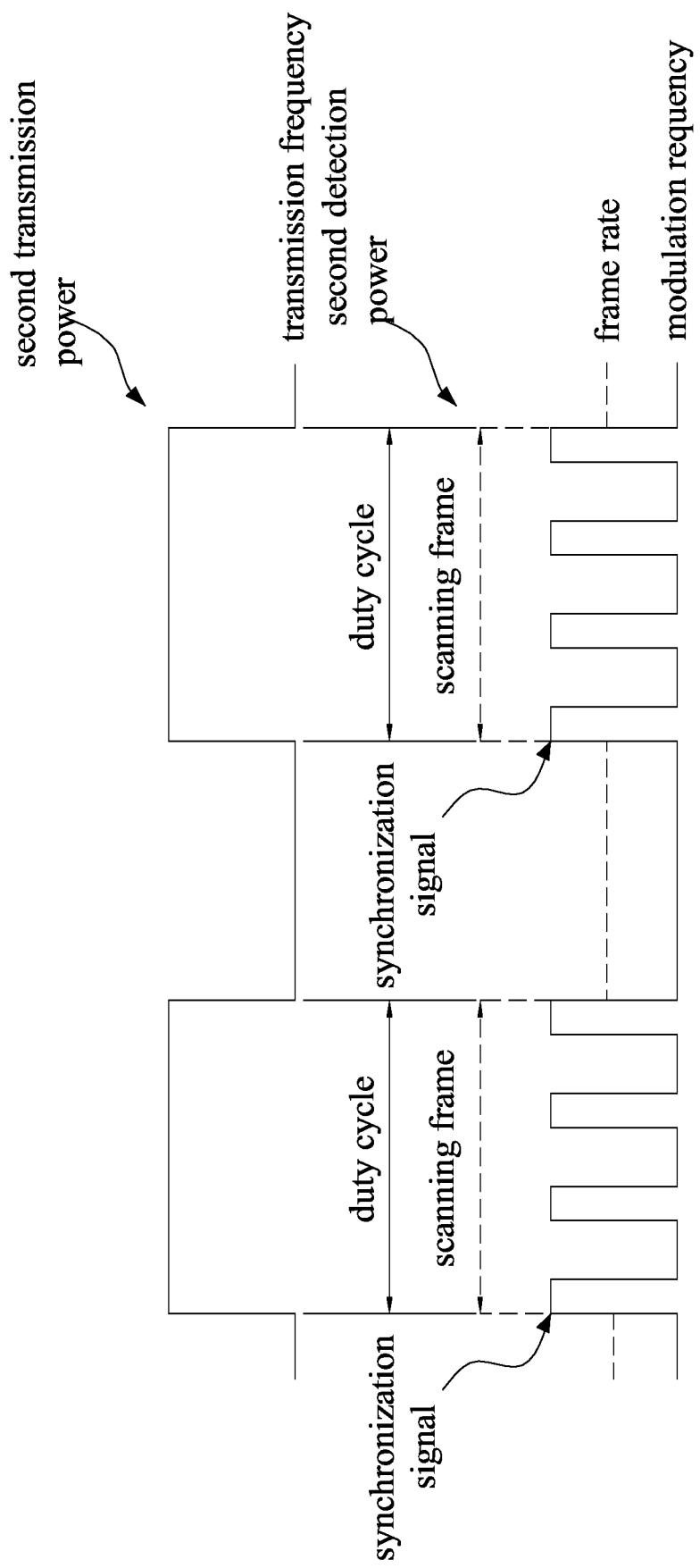

Referring to FIG. 3 and FIG. 4, the effective detection distance depends on the designated transmission power of the detection wave transmitter 110 and the designated detection power of the reflected wave receiver 120. Specifically, a longer transmission cycle, that is, a duty cycle of the detection wave transmitter 110 indicates a greater capability of forming a reflected wave R with sufficient intensity at a large distance by the detection wave D. Adjusting the designated transmission power is mainly adjusting a duty cycle, a transmission frequency, of the detection wave transmitter 110, and adjusting a peak power of the detection wave D. The duty cycle may be adjusted between 0% and 100%. At 0%, the detection wave transmitter 110 is turned off, and distance detection is stopped. However, when the vehicle 200 is started, the detection wave transmitter 110 and the reflected wave receiver 120 are usually not turned off. The detection wave transmitter 110 is turned on after the vehicle 200 is started. A duty cycle greater than 0% is still set at a vehicle speed of zero, and an initial transmission power is used as a designated transmission power at the vehicle speed of zero to start the detection wave transmitter 110. In addition to adjusting the duty cycle, adjusting the designated transmission power may also be adjusting a driving voltage or a driving current of the detection wave transmitter 110 to change the transmission frequency and the peak power of the detection wave D, or simultaneously adjusting the duty cycle, the transmission frequency, and the peak power.

The first vehicle speed and the second vehicle speed are used as an example. At the first vehicle speed, the controller 140 controls the transmitter driving circuit 130 with a first transmission power that is relatively high to drive the detection wave transmitter 110 to transmit the detection wave D with the first transmission power. In this case, as shown in FIG. 3, the duty cycle of the detection wave transmitter 110 is to be increased to enhance intensity of the detection wave D. At the second vehicle speed, the controller 140 controls the transmitter driving circuit 130 with a second transmission power that is relatively low to drive the detection wave transmitter 110 to transmit the detection wave D with the second transmission power. In this case, as shown in FIG. 4, the duty cycle of the detection wave transmitter 110 is to be reduced to lower the intensity of the detection wave D.

As shown in FIG. 1, specifically, the controller 140 may have a built-in digital-to-analog conversion function, to provide corresponding reference power (a reference voltage or a reference current) to the transmitter driving circuit 130 according to the designated transmission power, to have the transmitter driving circuit 130 to drive the detection wave transmitter 110 to transmit the detection wave D with the designated transmission power.

Figure 5:
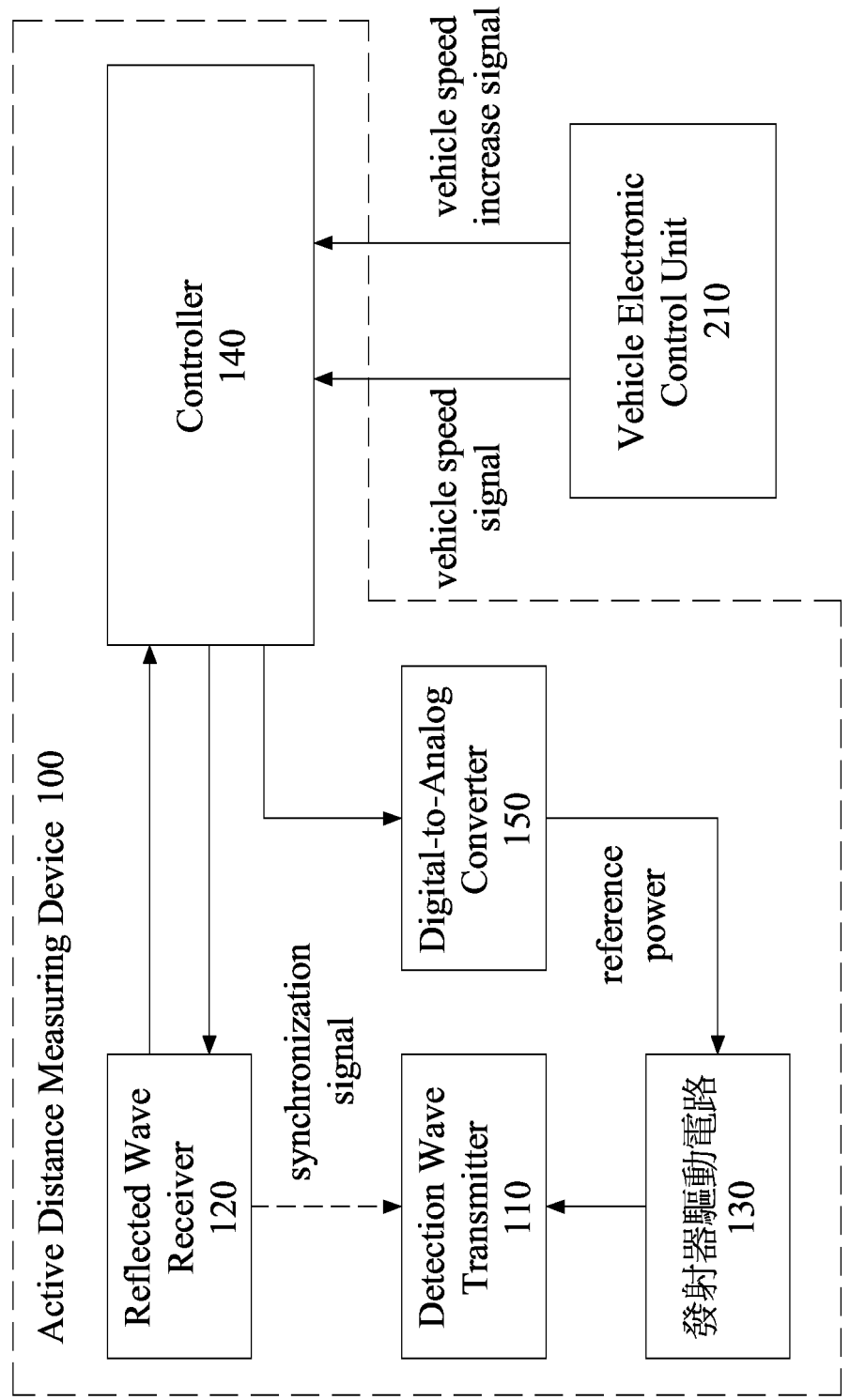
FIG. 5 is another circuit block diagram of an active distance measuring device according to the embodiment of this disclosure.

As shown in FIG. 5, when the controller 140 does not have the digital-to-analog conversion function, a digital-to-analog converter 150 may be provided, which is electrically connected to the controller 140. The transmitter driving circuit 130 is electrically connected to the digital-to-analog converter 150 to be indirectly electrically connected to the controller 140. The controller 140 controls the digital-to-analog converter 150 according to the designated transmission power, so that the digital-to-analog converter 150 provides corresponding reference power to the transmitter driving circuit 130, to have the transmitter driving circuit 130 drives the detection wave transmitter 110 to transmit the detection wave D with the designated transmission power.

Referring to FIG. 3 and FIG. 4 again, the effective detection distance is also related to a modulation frequency of the reflected wave receiver 120. A higher modulation frequency indicates higher sensitivity of the reflected wave receiver 120, so that a reflected wave R received at a long distance can be detected. A response rate is related to a frame rate of the reflected wave receiver 120. A higher frame rate indicates a quicker response of the reflected wave receiver 120 and a greater capability of rapidly responding to quick changes in a distance. Adjusting the designated detection power includes adjusting a modulation frequency and a frame rate of the received reflected wave R. Specifically, the controller 140 and the reflected wave receiver 120 may be connected through a bidirectional interface such as an I2C, so that the controller 140 not only can adjust the designated detection power but also can receive a detection result returned by the reflected wave receiver 120.

The first vehicle speed and the second vehicle speed are used as an example. At the first vehicle speed, the controller 140 controls, at a first detection power that is relatively high, the reflected wave receiver 120 to operate. In this case, as shown in FIG. 3, the modulation frequency is increased to improve sensitivity of the reflected wave receiver 120. In addition, the frame rate is also increased to speed up the response of the reflected wave receiver 120. At the second vehicle speed, the controller 140 controls, at a second detection power that is relatively low, the reflected wave receiver 120 to operate. In this case, as shown in FIG. 4, the modulation frequency is to be reduced to reduce the sensitivity of the reflected wave receiver 120. In addition, the frame rate is also reduced to reduce the response rate of the reflected wave receiver 120. Generally, a current vehicle speed of the vehicle 200 is positively correlated with the designated transmission power and the designated detection power. A higher current speed of the vehicle 200 indicates a higher designated transmission power and a higher designated detection power. A lower current speed of the vehicle 200 indicates a lower designated transmission power and a lower designated detection power.

A specific combination of the detection wave transmitter 110 and the reflected wave receiver 120 is further exemplified below for description.

A LiDAR (Light Detection And Ranging) is used as an example. The detection wave transmitter 110 has an array formed by a plurality of transmitting units, and the reflected wave receiver 120 has an array formed by a plurality of receiving units. The LiDAR rotates by 360 degrees at a specific RPM to perform 360-degree scanning on each direction of the vehicle 200.

In the LiDAR, two parameters may be used to adjust the transmission power of the detection wave D. One is used to adjust a driving current or a driving voltage of the detection wave transmitter 110 to change the peak power of the detection wave D (an invisible light laser), and the other is used to adjust the transmission frequency of the detection wave D. A higher transmission frequency indicates a higher transmission power, and a lower transmission frequency indicates a lower transmission power. In the LiDAR, only the modulation frequency of the reflected wave R can be usually adjusted to change the detection power of the reflected wave receiver 120, and the modulation frequency needs to match the transmission frequency. The frame rate is related to a rotation speed of the LiDAR. The LiDAR can complete a scanning frame every 360-degree rotation, and the modulation frequency is related to the number of points that the LiDAR can detect during every 360-degree rotation.

Therefore, an overall modulation frequency of the LiDAR may be the modulation frequency of the reflected wave receiver 120 multiplied by the rotation speed of the LiDAR. For example, after every 360-degree rotation of the LiDAR, the reflected wave receiver 120 can detect 1000 points, and if the LiDAR rotates 20 times per second, the overall modulation frequency of the LiDAR is 20 KHz. After every 360-degree rotation of the LiDAR, the reflected wave receiver 120 can detect 720 points, and if the LiDAR rotates 5 times per second, the overall modulation frequency of the LiDAR is 3.6 KHz. A higher modulation frequency of the reflected wave receiver 120 (denser detection points) indicates a more precise object 300 that the LiDAR can detect, and a higher rotation speed of the LiDAR indicates a greater capability of response to environmental changes, which is suitable for a situation in which the vehicle speed of the vehicle 200 is relatively large. Otherwise, a lower modulation frequency of the reflected wave receiver 120 indicates a lower rotation speed of the LiDAR, which is suitable for a situation in which the speed of the vehicle 200 is relatively low, so that power consumption of the LiDAR can be reduced.

A three-dimensional time-of-flight (3D ToF) sensor is used as an example. In the ToF sensor, two parameters may be used to adjust the transmission power of the detection wave D. One is used to adjust the driving current or the driving voltage of the detection wave transmitter 110, to change the peak power of the detection wave D (an invisible light laser); and the other is used to adjust the transmission frequency of the detection wave D. A higher transmission frequency indicates a higher transmission power, and a lower transmission frequency indicates a lower transmission power. In the ToF sensor, only the modulation frequency of receiving the reflected wave R can be usually adjusted to change the detection power of the reflected wave receiver 120, and the modulation frequency needs to match the transmission frequency.

The reflected wave receiver 120 can obtain X×Y depth values in each scanning frame. The ToF sensor measures a distance by using a time-of-flight of light. Therefore, the distance is the light speed (which is a constant) multiplied by a spent time. An inverse of the time is the modulation frequency. A higher modulation frequency indicates a shorter time, and a smaller distance unit that can be detected indicates a more precise object 300 to be detected. Therefore, when the modulation frequency is 20 MHz, the accuracy is 300,000 kilometers/20 MHz=15 meters. When the modulation frequency is 10 MHz, the accuracy is 300,000 kilometers/10 MHz=35 meters. A vehicle travelling at a speed of 100 kilometers per hour travels 27.78 meters per second. When the vehicle 200 travels at a speed of 100 kilometers per hour, if the distance is to be detected with a modulation frequency of 10 MHz, the accuracy may be insufficient to accurately determine the object 300. In this case, the modulation frequency needs to be increased to 20 MHz, and a driving power of the detection wave transmitter 110 is also increased to increase a peak power of the detection, so that a reflected wave R of sufficient intensity can still be generated at a relatively long distance. Otherwise, when the vehicle 200 travels at a speed of 50 kilometers per hour, a modulation frequency of 10 MHz can be used to detect the distance.

In addition, adjustable parameters are also different in different combinations of the detection wave transmitter 110 and the reflected wave receiver 120. For example, the transmission frequency and the modulation frequency cannot be adjusted for ultrasonic waves and radar waves, but the driving power of the detection wave transmitter 110 and the frame rate of the reflected wave receiver 120 can be adjusted, and the designated transmission power and the designated detection power may also be adjusted.

Referring to FIG. 1 again, the vehicle speed status may also include a vehicle speed increase signal. The vehicle speed increase signal may be a throttle signal or an acceleration detector signal for determining current acceleration of the vehicle 200. The throttle signal and the acceleration detector signal may also be obtained by the vehicle electronic control unit 210. The controller 140 obtains the current acceleration according to the vehicle speed increase signal, determines a predicted vehicle speed after a retention time, and increases the designated transmission power and the designated detection power in advance to correspond to the predicted vehicle speed.

As shown in FIG. 4, when the vehicle 200 travels at the second vehicle speed, the detection wave transmitter 110 and the reflected wave receiver 120 respectively operate at the second transmission power and the second detection power. In this case, if a driver depresses a throttle to accelerate the vehicle 200, the controller 140 may receive the throttle signal and the acceleration detector signal from the vehicle electronic control unit 210, calculate the current acceleration of the vehicle 200, and determine that the vehicle speed is to reach the first vehicle speed after the retention time. In this case, the controller 140 first controls the transmitter driving circuit 130 with the first transmission power to drive the detection wave transmitter 110 to transmit the detection wave D with the first transmission power. In addition, the controller 140 controls, with the first detection power, the reflected wave receiver 120 to operate.

The retention time is mainly for matching a lag during power switching of the detection wave transmitter 110 and the reflected wave receiver 120, to avoid a case that the power of the detection wave transmitter 110 and the reflected wave receiver 120 cannot be increased in real time after the vehicle speed is increased.

As shown in FIG. 1, FIG. 3, and FIG. 4, in order to have the transmission frequency of the detection wave transmitter 110 and the frame rate of the reflected wave receiver 120 to be consistent and the duty cycle and the sampling cycle to overlap, the detection wave transmitter 110 and the reflected wave receiver 120 are further connected through a synchronization signal line to transmit a synchronization signal. The reflected wave receiver 120 transmits the synchronization signal to the detection wave transmitter 110 upon start of each scanning frame, so as to trigger the detection wave transmitter 110 to start its duty cycle to transmit the detection wave D. The synchronization signal may also be transmitted from the detection wave transmitter 110 to the reflected wave receiver 120 in an opposite direction, provided that the transmission frequency is synchronized with the frame rate, that is, the detection wave transmitter 110 transmits the synchronization signal to the reflected wave receiver 120 when starting its duty cycle, so that the reflected wave receiver 120 starts sampling. Alternatively, the synchronization signal may also be derived from an external oscillator and transmitted to both the detection wave transmitter 110 and the reflected wave receiver 120.

Figure 6:
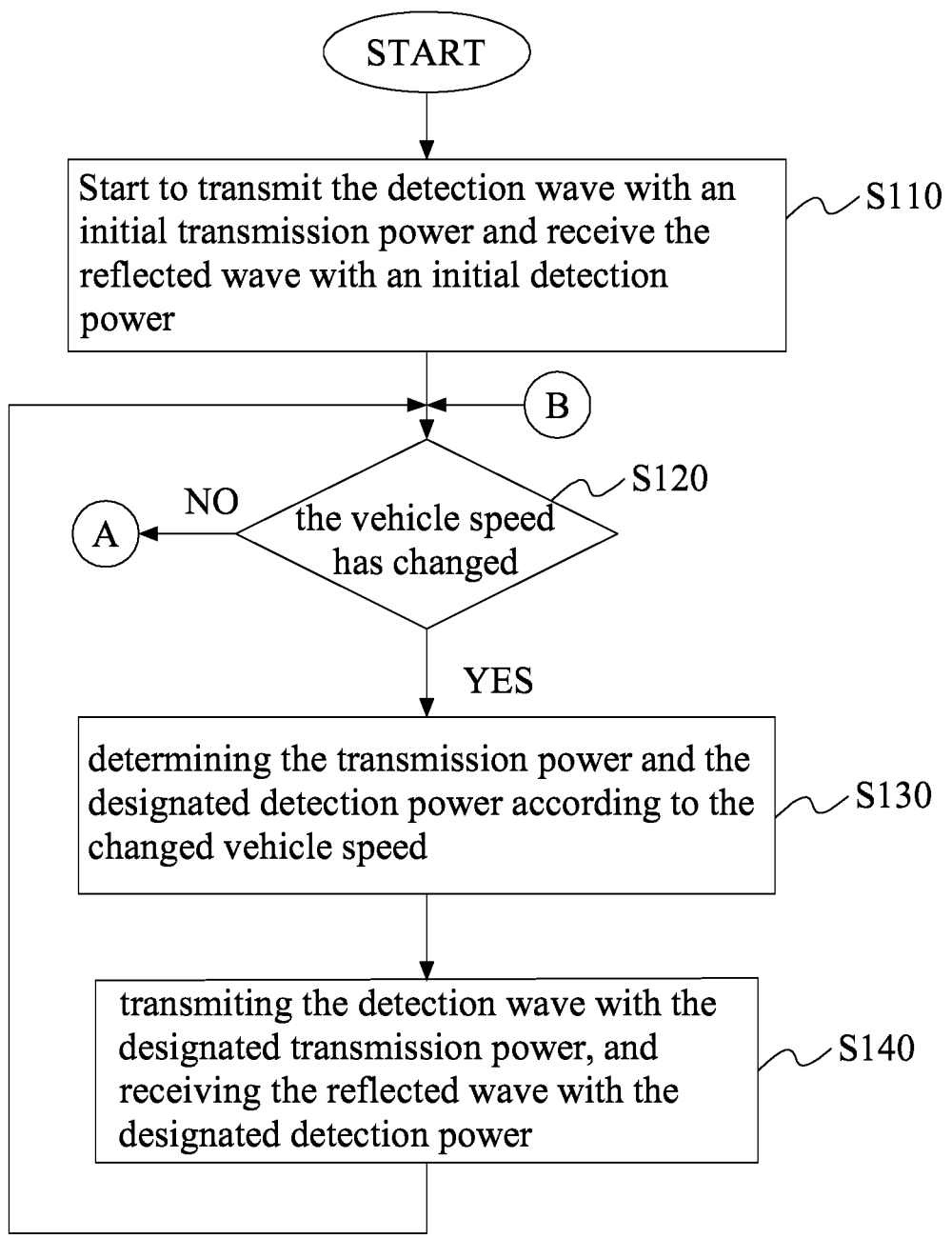
FIG. 6 and FIG. 7 are flowcharts of an active distance measuring method according to the embodiment of this disclosure.

Referring to FIG. 6, based on the above active distance measuring device 100, this disclosure further provides an active distance measuring method.

As shown in FIG. 6, after a vehicle 200 is started, the controller 140 enables the detection wave transmitter 110 and the reflected wave receiver 120 with an initial transmission power and an initial detection power, and starts to transmit the detection wave D and receive the reflected wave R, to obtain distance information according to a transmission state of the detection wave D and reflected wave information, as shown in step S110. In this case, the controller 140 may start to give a collision warning, and even though the vehicle 200 is in a parking state, the controller may also give a collision warning for possible rear-end collision events.

As shown in FIG. 6, the controller 140 then continuously receives a vehicle speed signal related to a vehicle speed and a vehicle speed increase signal related to a vehicle speed increase from the vehicle electronic control unit 210, to determine whether the vehicle speed has changed according to the vehicle speed signal, as shown in step S120.

As shown in FIG. 6, if the vehicle speed has changed, the controller 140 determines the transmission power and the designated detection power according to the changed vehicle speed, as shown in step S130. The controller 140 controls the detection wave transmitter 110 to transmit the detection wave D with the designated transmission power to form the reflected wave R, and controls the reflected wave receiver 120 to receive the reflected wave R with the designated detection power, so that the controller 140 continuously obtains distance information by means of transmission and reception states of the detection wave D and the reflected wave R, as shown in step S140, and then performs step S120, or continues to perform other steps. If it is determined in step S120 that the changed vehicle speed is zero, the designated transmission power and the designated detection power are the initial transmission power and the initial detection power in step S110.

Figure 7:
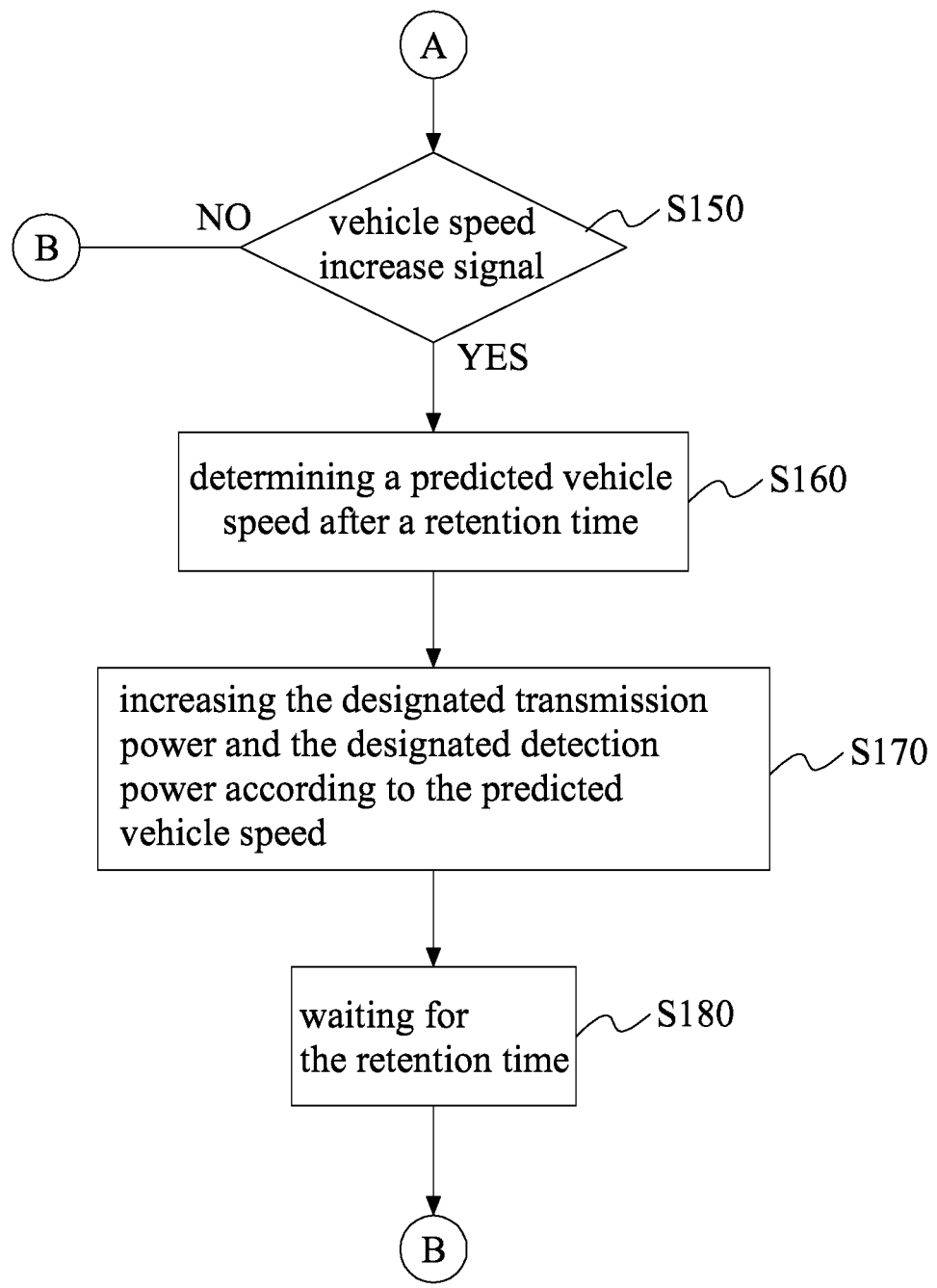

Referring to FIG. 6 and FIG. 7, since the vehicle speed status may also include a vehicle speed increase signal, the vehicle speed increase signal may be a throttle signal or an acceleration detector signal for determining current acceleration of the vehicle 200, so as to determine a predicted vehicle speed after a retention time. Therefore, after it is determined in step S120 that the vehicle speed is not changed, the following steps may be performed.

As shown in FIG. 7, the controller 140 determines whether a vehicle speed increase signal is received, as shown in step S150.

The throttle signal and the acceleration detector signal may also be obtained by the vehicle electronic control unit 210. The controller 140 obtains the current acceleration according to the vehicle speed increase signal, and determines a predicted vehicle speed after a retention time, as shown in step S160. The controller 140 then increases the designated transmission power and the designated detection power in advance according to the predicted vehicle speed to correspond to the predicted vehicle speed, as shown in step S170. The controller 140 waits for the retention time, as shown in step S180, and then performs step S120. The retention time is mainly for matching a lag during power switching of the detection wave transmitter 110 and the reflected wave receiver 120, to avoid a case that the power of the detection wave transmitter 110 and the reflected wave receiver 120 cannot be increased in real time after the vehicle speed is increased.

According to the active distance measuring device 100 and the active distance measuring method of this disclosure, the transmission of the detection wave D and the receiving of the reflected wave are not normally performed with a fixed power, but with a dynamically adjusted power according to a vehicle speed. When the vehicle 200 travels at a relatively low vehicle speed, the transmission power of the detection wave D and the detection power of the reflected wave R can be reduced in time according to the vehicle speed, and may be increased at a relatively high vehicle speed. Therefore, this disclosure not only can effectively reduce power consumption of the active distance measuring device 100, but also can maintain required distance measuring sensitivity and accuracy.

What is claimed is:

1. An active distance measuring device, comprising:
a detection wave transmitter, configured to transmit a detection wave with a designated transmission power to be reflected to form a reflected wave;
a reflected wave receiver, configured to operate at a designated detection power to receive the reflected wave and generate reflected wave information; and
a controller, electrically connected to the detection wave transmitter and the reflected wave receiver to control the detection wave transmitter to transmit the detection wave and receive the reflected wave information, so as to obtain distance information based on a transmission state of the detection wave and the reflected wave information, wherein the controller is further configured to receive a vehicle speed signal to adjust the designated transmission power and the designated detection power according to the vehicle speed signal;
wherein the controller is further configured to receive a vehicle speed increase signal, determine a predicted vehicle speed after a retention time based on the vehicle speed increase signal, and increase the designated transmission power and the designated detection power to correspond to the predicted vehicle speed.

2. The active distance measuring device according to claim 1, wherein the vehicle speed signal corresponds to a vehicle speed and the vehicle speed is positively correlated with the designated transmission power and the designated detection power.

3. The active distance measuring device according to claim 1, further comprising a transmitter driving circuit electrically connected to the detection wave transmitter, wherein the controller is electrically connected to the transmitter driving circuit, and the controller controls the transmitter driving circuit according to the designated transmission power, to have the transmitter driving circuit to drive the detection wave transmitter to transmit the detection wave with the designated transmission power.

4. The active distance measuring device according to claim 3, wherein the controller provides corresponding reference power to the transmitter driving circuit according to the designated transmission power, to have the transmitter driving circuit to drive the detection wave transmitter to transmit the detection wave with the designated transmission power.

5. The active distance measuring device according to claim 3, further comprising a digital-to-analog converter electrically connected to the controller, wherein the controller controls the digital-to-analog converter according to the designated transmission power, so that the digital-to-analog converter provides corresponding reference power to the transmitter driving circuit, to have the transmitter driving circuit to drive the detection wave transmitter to transmit the detection wave with the designated transmission power.

6. The active distance measuring device according to claim 1, wherein to adjust the designated transmission power comprises to adjust a duty cycle or a transmission frequency of the detection wave transmitter, or adjust a peak power of the detection wave.

7. The active distance measuring device according to claim 1, wherein to adjust the designated detection power comprises to adjust a modulation frequency or a frame rate of the reflected wave receiver.

8. The active distance measuring device according to claim 1, wherein the detection wave transmitter and the reflected wave receiver are synchronized through a synchronization signal.

9. An active distance measuring method, comprising:
continuously receiving a vehicle speed signal related to a vehicle speed;
determining a designated transmission power and a designated detection power according to the vehicle speed;
transmitting a detection wave with the designated transmission power to form a reflected wave, and receiving the reflected wave with the designated detection power, so as to obtain distance information;
determining whether the vehicle speed has changed;
adjusting the designated transmission power and the designated detection power according to the changed vehicle speed when the vehicle speed has changed;
determining whether a vehicle speed increase signal is received;
determining a predicted vehicle speed after a retention time according to the vehicle speed increase signal; and
increasing the designated transmission power and the designated detection power according to the predicted vehicle speed to correspond to the predicted vehicle speed.

10. The active distance measuring method according to claim 9, further comprising before the continuously receiving the vehicle speed signal related to a vehicle speed, starting to transmit the detection wave with an initial transmission power and receive the reflected wave with an initial detection power.

11. The active distance measuring method according to claim 9, wherein the vehicle speed is positively correlated with the designated transmission power and the designated detection power.

12. The active distance measuring method according to claim 9, wherein adjusting the designated transmission power comprises adjusting a duty cycle or a transmission frequency of the detection wave, or adjusting a peak power of the detection wave.

13. The active distance measuring method according to claim 9, wherein adjusting the designated detection power comprises adjusting a modulation frequency or a frame rate of receiving the reflected wave.

* * * * *